(12) United States Patent
Qiu et al.

(10) Patent No.: US 12,254,051 B2
(45) Date of Patent: Mar. 18, 2025

(54) CRAWL ALGORITHM

(71) Applicant: Google LLC, Mountain View, CA (US)

(72) Inventors: Linhai Qiu, Palo Alto, CA (US); Robert Istvan Busa-Fekete, Chatham, NJ (US); Julian Ulf Zimmert, Berlin (DE); Andras Gyorgy, London (GB); Hao Shen, Mountain View, CA (US); Hyomin Choi, Mountain View, CA (US); Sharmila Vijay, Mountain View, CA (US); Li Xiao, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/473,877

(22) Filed: Sep. 25, 2023

(65) Prior Publication Data
US 2024/0111819 A1 Apr. 4, 2024

Related U.S. Application Data

(60) Provisional application No. 63/377,710, filed on Sep. 29, 2022.

(51) Int. Cl.
G06F 16/951 (2019.01)
(52) U.S. Cl.
CPC .................. G06F 16/951 (2019.01)
(58) Field of Classification Search
CPC .................................................. G06F 16/951
See application file for complete search history.

(56) References Cited

U.S. PATENT DOCUMENTS

| 2008/0304411 | A1* | 12/2008 | Ikada | H04L 47/70 370/232 |
| 2010/0205168 | A1* | 8/2010 | Yang | G06F 16/951 707/E17.108 |
| 2013/0144858 | A1* | 6/2013 | Lin | G06F 16/951 707/E17.108 |
| 2020/0372084 | A1* | 11/2020 | Kolobov | G06F 9/4881 |

OTHER PUBLICATIONS

International Search Report and Written Opinion for related PCT Application No. PCT/US/2023/033641, dated Jan. 10, 2024.

* cited by examiner

Primary Examiner — Mark D Featherstone
Assistant Examiner — Kweku William Halm
(74) Attorney, Agent, or Firm — Honigman LLP; Brett A. Krueger

(57) ABSTRACT

A method for a crawl algorithm includes obtaining a plurality of web pages for a web crawler to crawl. The method also includes determining an available bandwidth for the web crawler. The method includes, for each respective web page of the plurality of web pages, determining a respective crawl value for the respective web page based on the available bandwidth and determining that the respective crawl value of the respective web page satisfies a threshold value. The method includes, in response to determining that the respective crawl value of the respective web page satisfies the threshold value, updating the respective web page in a cache memory.

18 Claims, 4 Drawing Sheets

CRAWL ALGORITHM

CROSS REFERENCE TO RELATED APPLICATIONS

This U.S. patent application claims priority under 35 U.S.C. § 119(e) to U.S. Provisional Application 63/377,710, filed on Sep. 29, 2022. The disclosure of this prior application is considered part of the disclosure of this application and is hereby incorporated by reference in its entirety.

TECHNICAL FIELD

This disclosure relates to a crawl algorithm.

BACKGROUND

A web crawler is a software application that systematically browses the World Wide Web to index current versions of web pages, typically for use by a search engine. In theory, the web crawler should have the most recent copy of each web page available for the search engine. However, updating the index with current versions of web pages can be computationally expensive, especially for a large number of web pages. Thus, one problem of web crawling is keeping a cache of web pages fresh while limiting the expense on available resources.

SUMMARY

One aspect of the disclosure provides a computer-implemented method for a crawl algorithm. The computer-implemented method is executed by data processing hardware that causes the data processing hardware to perform operations including obtaining a plurality of web pages for a web crawler to crawl. The operations include, determining an available bandwidth for the web crawler. The operations also include, for each respective web page of the plurality of web pages determining a respective crawl value for the respective web page based on the available bandwidth, determining that the respective crawl value of the respective web page satisfies a threshold value, and in response to determining that the respective crawl value of the respective web page satisfies the threshold value, updating the respective web page in a cache memory.

Implementations of the disclosure may include one or more of the following optional features. In some implementations, the respective crawl value is based on a change indicating signal received from the respective web page. In these implementations, the change indicating signal may include a true positive signal or a false positive signal. Also in these implementations, the change indicating signal may include a delayed signal.

The available bandwidth may satisfy a bandwidth threshold. Further, determining the respective crawl value may include using a machine learning engine to determine the respective crawl value. In some implementations, the operations include dividing the plurality of web pages into a plurality of shards. In these implementations, the operations include, for each respective shard of the plurality of shards determining a respective shard crawl value of the respective shard based on the available bandwidth, determining that the respective shard crawl value of the respective shard satisfies a threshold shard value, and in response to determining that the respective shard crawl value of the respective shard satisfies the threshold shard value, updating each web page of the respective shard in the cache memory. In these implementations, each respective shard may be assigned a respective shard bandwidth comprising a portion of the available bandwidth.

In some implementations, the operations include, for each respective web page of the plurality of web pages, estimating an update time for the respective crawl value of the respective web page, and updating the respective crawl value of the respective web page at the estimated update time. The operations may further include, for each respective web page of the plurality of web pages, updating the respective crawl value for the respective web page at every time step of a discrete time interval.

Another aspect of the disclosure provides a system for a crawl algorithm. The system includes data processing hardware and memory hardware in communication with the data processing hardware. The memory hardware stores instructions that when executed on the data processing hardware cause the data processing hardware to perform operations. The operations include obtaining a plurality of web pages for a web crawler to crawl. The operations include, determining an available bandwidth for the web crawler. The operations also include, for each respective web page of the plurality of web pages determining a respective crawl value for the respective web page based on the available bandwidth, determining that the respective crawl value of the respective web page satisfies a threshold value, and in response to determining that the respective crawl value of the respective web page satisfies the threshold value, updating the respective web page in a cache memory.

This aspect may include one or more of the following optional features. In some implementations, the respective crawl value is based on a change indicating signal received from the respective web page. In these implementations, the change indicating signal may include a true positive signal or a false positive signal. Also in these implementations, the change indicating signal may include a delayed signal.

The available bandwidth may satisfy a bandwidth threshold. Further, determining the respective crawl value may include using a machine learning engine to determine the respective crawl value. In some implementations, the operations include dividing the plurality of web pages into a plurality of shards. In these implementations, the operations include, for each respective shard of the plurality of shards determining a respective shard crawl value of the respective shard based on the available bandwidth, determining that the respective shard crawl value of the respective shard satisfies a threshold shard value, and in response to determining that the respective shard crawl value of the respective shard satisfies the threshold shard value, updating each web page of the respective shard in the cache memory. In these implementations, each respective shard may be assigned a respective shard bandwidth comprising a portion of the available bandwidth.

In some implementations, the operations include, for each respective web page of the plurality of web pages, estimating an update time for the respective crawl value of the respective web page, and updating the respective crawl value of the respective web page at the estimated update time. The operations may further include, for each respective web page of the plurality of web pages, updating the respective crawl value for the respective web page at every time step of a discrete time interval.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Efficient web crawling is one of the most fundamental data management problems in web search. Web pages are the simplest and most ubiquitous sources of information on the Internet, therefore, extracting and organizing information content from web pages remains a crucial task. Web crawlers regularly crawl web pages to ensure that the information available for a corresponding search engine or web browser is up-to-date. However, given that there are hundreds of trillions of web pages available online, resource-aware crawling algorithms are of great practical interest.

Web crawlers typically poll web pages to determine if a web page has changed. When the web page has changed, the web crawler can perform a crawl event (i.e., update the web page information in a memory cache). In an ideal solution, the web crawler would continuously poll all web pages for changes and then perform crawl events accordingly. However, polling uses network resources and thus continuous polling is impractical. Further, scheduling crawl events at predefined discrete time intervals is also an imperfect solution as a web page can change a number of times during the time interval without being updated in the cache, resulting in the web page being stale/out-of-date in the memory cache.

Implementations herein include a web crawler that uses an algorithm for efficient and effective web crawling designed to optimize the use of resources while maximizing a probability that web pages available in a memory cache are current. An efficient web crawler, as described herein, aims to schedule crawl events (i.e., updating the web page in the cache) between content change of a web page and content request events for the corresponding web page. In other words, the web crawler aims to minimize the amount of unnecessary crawl events (and polling). In some implementations, the crawling algorithm of the current application utilizes one or more change indicating signals received from web pages to optimize crawl events while maintaining sufficiently updated web pages in a memory cache. For example, the web crawler schedules crawl events based on received change indicating signals. In some implementations, the web crawler is optimized according to an available bandwidth. For example, the web crawler is optimized based on a bandwidth constraint that is constant over time or non-uniform (i.e., variable over time).

Figure 1:
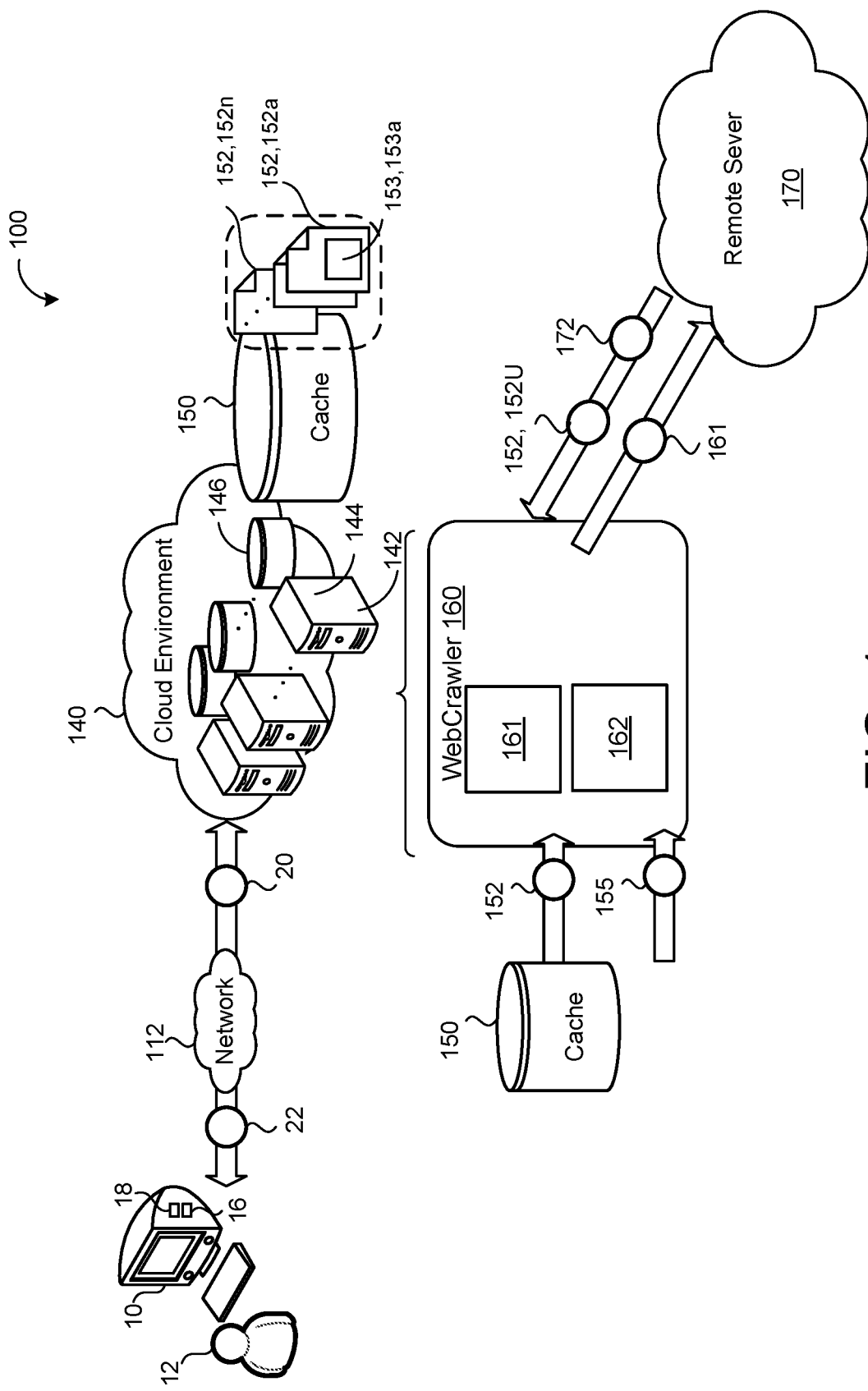
FIG. 1 is a schematic view of an example system for a crawl algorithm.

FIG. 1 is a schematic view of an example system 100 for a crawling algorithm. The system 100 includes a client 12 using a client device 10 to access a cloud computing environment 140. The client device 10 includes data processing hardware 16 and memory hardware 18. The client device 10 can be any computing device capable of communicating with the cloud computing environment 140 through, for example, a network 112. The client device 10 may transmit search engine request 20 to the cloud computing environment 140 and receive search results 22. The search results may be based on a plurality of web pages 152, 152a—n stored at a cache memory 150 available to the search engine. The client device 10 includes, but is not limited to, desktop computing devices and mobile computing devices, such as laptops, tablets, smart phones, smart speakers/displays, smart appliances, internet-of-things (IoT) devices, and wearable computing devices (e.g., headsets and/or watches).

In some implementations, the client device 10 is in communication with the cloud computing environment 140 (also referred to herein as a remote system 140) via the network 112. The cloud computing environment 140 may be a single computer, multiple computers, or a distributed system (e.g., a cloud environment) having scalable/elastic resources 142 including computing resources 144 (e.g., data processing hardware) and/or storage resources 146 (e.g., memory hardware). A cache memory 150 may be used to store at least portions of web pages 152, 152a—n. In some implementations, the cache memory 150 is available to a search engine, such that the search engine can quickly scan multiple web pages 152 to return results to a user promptly. The cache memory 150 may store a copy of each web page 152 as a file copy, an index, a snapshot, etc. Each web page 152 may also include a corresponding crawl value 153, 153a—n indicating a priority for the web page 152 to be refreshed. The cloud computing environment 140 may execute some or all of the web crawler 160. Typically, the web crawler 160 executes remotely (e.g., at the remote system 140). However, in some implementations, at least a portion of the web crawler 160 executes locally on the client device 10 (e.g., on the data processing hardware 16). Likewise, the cache memory 150 may be stored locally at the client device 10 or stored at the remote system 140 or any combination thereof.

The web crawler 160 may manage the cache memory 150 storing a number of web pages 152 for a search engine or web browser. In some implementations, the objective of the web crawler 160 is to maximize the expected number of web page requests that are served with a fresh copy of the corresponding web page while also optimizing the use of system resources. The web crawler 160 may schedule crawl events for the web pages 152 based on the respective crawl value 153 associated with the web pages 152. The web crawler 160 may determine the crawl values 153 based on various information. For example, the web crawler 160 uses an available bandwidth 155 to at least partially determine crawl values 153. For example, a larger available bandwidth corresponds to larger crawl values 153 and thus more frequent crawl events (i.e., because the greater available bandwidth supports more frequent crawls). The crawl values 153 may always be based, at least in part, on the available bandwidth 155. In some implementations, the web crawler 160 includes a machine learning engine 161 that calculates crawl values 153. For example, the machine learning engine 161 includes a model trained to determine the crawl values 153 based on the available bandwidth 155, the frequency of changes of web pages, the frequency of requests for web pages 152, etc. The web crawler 160 may constantly update the crawl values 153 for web pages 152 as new information is received.

The web crawler 160 may implement a discrete model where crawl events are uniformly triggered at fixed time steps over a time interval. For example, over a time interval T, the web crawler 160 generates crawl events at periodic time steps $t_1, t_2, t_3, \ldots t_n$. In this example, the web crawler 160 compares the crawl value 153 for each web page 152 to a threshold value 162. For each web page 152 having a respective crawl value 153 that satisfies (e.g., exceeds) the threshold value 162, the web crawler 160 schedules a crawl event for the web page 152n at the next time step. The web crawler 160 may initiate the crawl event by sending a request 161 to an external server 170 corresponding to the web page 152 being updated. In turn, the web crawler 160 may receive an updated web page 152U from the remote server 170. In some implementations, the web crawler 160 estimates an update time for crawl values 153 for respective web pages 152. The estimated update time may be based on the current crawl value 153. For example, the web crawler 160 determines, based on a current crawl value 153, that a web page 152 will have a crawl value 153 that satisfies the threshold value 162 at a time step $t_i$. Accordingly, the web crawler 160 then schedules to recalculate the crawl value 153 of the web page 152 at the time step $t_i$.

The web crawler 160 may also determine the crawl values 153 based on a received change event indicator 172 (e.g., received from remote server 170 corresponding to the web page 152). The change event indicator 172 indicates that a change has occurred at a web page 152 (e.g., content on the web page 152 has been added, removed, or modified). Based on the change event indicator 172, the web crawler 160 may recalculate the crawl value 153 for the web page 152. In some implementations, the change event indicator 172 is a delayed change event indicator. For example, a change event indicator 172 is sent after a non-trivial time has elapsed from the time that the web page 152 changed. In this case, the web crawler 160 may or may not adjust the crawl value 153 for the web page 152. For example, if the web crawler 160 updated the web page 152 after the web page 152 changed, but before the change event indicator 172 was received, the web crawler 160 does not recalculate the crawl value 153. However, if the web crawler 160 did not update the web page 152 after the web page 152 changed (according to the change event indicator 172), the web crawler 160 may recalculate the crawl value 153 and/or initiate a crawl event. In some implementations, the change event indicator 172 is either a true positive signal or a false positive signal. In other words, the change event indicator 172 may not always accurately indicate that a change occurred at a respective web page 152. Accordingly, the web crawler 160 may factor in the rate of false positives of received change event indicators 172 when determining crawl values 153 (e.g., by using the machine learning engine).

In some implementations, the web crawler 160 bundles the plurality of web pages 152 into a plurality of shards. Each shard may include one or more web pages 152. Further, each shard may be defined based on some feature of the web pages 152 such that similar web pages 152 are grouped together in a respective shard. For example, the shards may be based on a refresh rate, a type of web page, an access rate, etc. In some of these implementations, each shard is assigned a portion of bandwidth of the available bandwidth 155. In some implementations, each shard is assigned an equal portion of the available bandwidth (i.e., each shard is assigned the same amount of bandwidth). In other implementations, each shard is assigned a corresponding portion of bandwidth based on features of the web pages included in the shard. For example, a shard that includes web pages that are updated frequently is assigned a larger portion of the available bandwidth relative to another shard that includes web pages that are less frequently updated.

The system 100 of FIG. 1 is presented for illustrative purposes only and is not intended to be limiting. For example, although only a single example of each component is illustrated, the system 100 includes any number of components 10, 140, 150, 160, and 170. Further, although some components are described as being located in the cloud environment 140, in some implementations, some or all of the components may be hosted locally on the client device 10. Further, in various implementations, some or all of the components 150 and 160, are hosted locally on client device 10, remotely (such as in the cloud environment 140), or some combination thereof.

Figure 2:
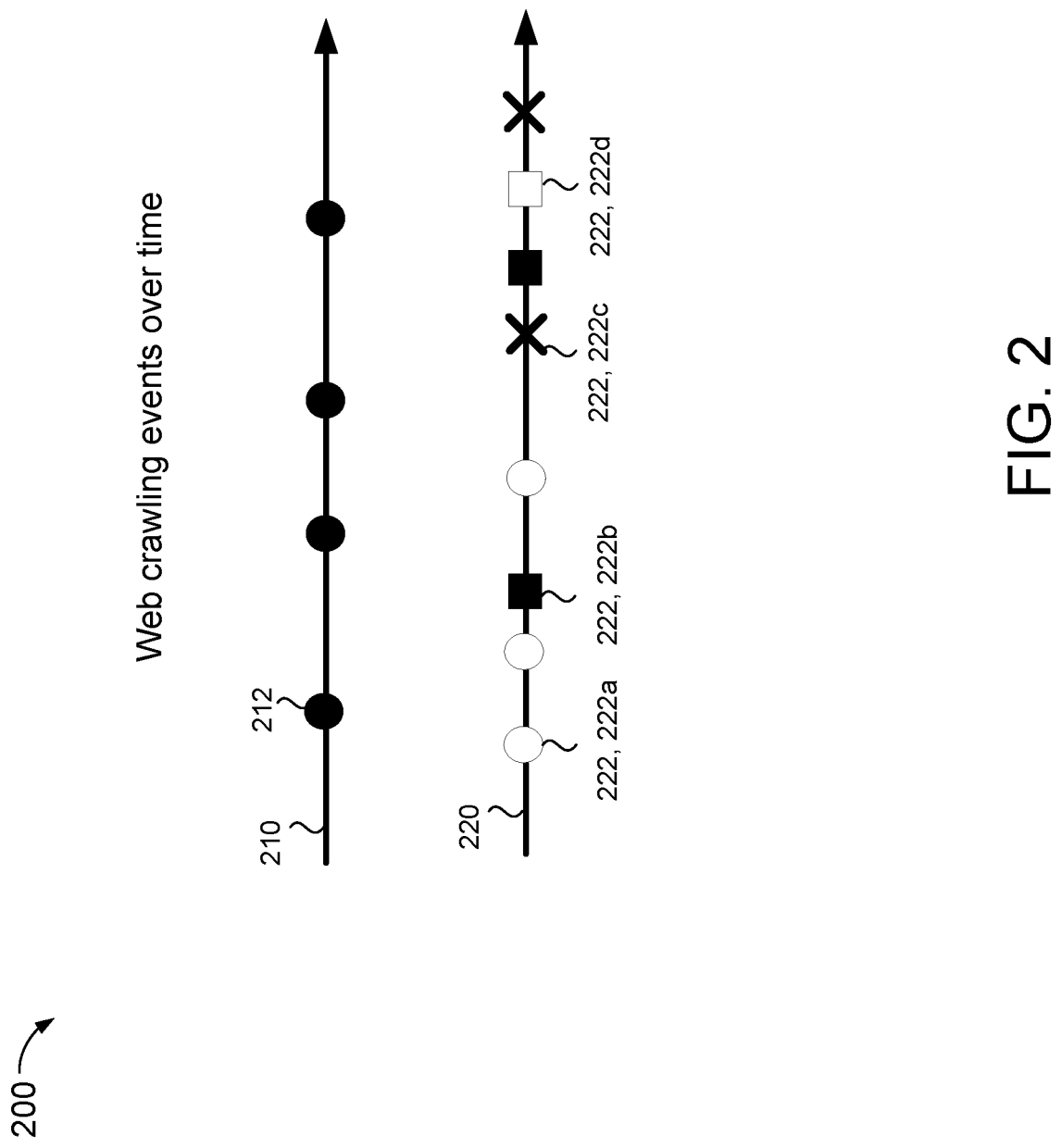
FIG. 2 is an example schematic view of crawl algorithm events over time.

FIG. 2 is an example schematic view 200 of crawl algorithm events over time. The timelines 210, 220 represent events actions caused by the web crawler 160 or from a web page 152 (i.e., a server 170 corresponding to the web page 152), respectively. As time progresses, the web crawler 160 may receive information and generate one or more crawl events 212 (indicated by a black circle in the schematic view 200). For example, the web crawler 160 initiates a crawl event 212 by sending an update request 161 for a web page 152 to an external server (i.e., server 170 of FIG. 1) corresponding to the web page 152. In turn, the web crawler 160 receives an updated web page 152U in response. In some implementations, the web crawler 160 initiates a crawl event 212 for a web page 152 when the respective crawl value 153 of the web page 152 satisfies a threshold value 162. The threshold value 162 may be a predefined value. Alternatively, the threshold value 162 is based on the top percentile of crawl values 153 for the respective web pages 152 in the cache memory 150. In some implementations, a crawl event 212 is initiated in response to a change event indicator 172.

The web crawler 160 may receive information corresponding to the web pages 152 (i.e., through the change event indicator 172, generated in response to a change in a web page). A change in the web page is described as a change event 222. When a change event 222 occurs for a web page 152, a server 170 corresponding to the web page 152 may or may not generate a change event indicator 172. For example, each change event 222 corresponds to one of a change event 222, 222a (indicated by a white circle in the schematic view 200) that does not include a corresponding change event indicator 172, a change event 222, 222b (indicated by a black square in the schematic view 200) where a true positive change event indicator 172 is transmitted, a change event 222, 222c (indicated by a black X in the schematic view 200) corresponding to a change event indicator 172 that is a false positive, or a change event 222, 222d (indicated by a white square in the schematic view 200) corresponding to a change event indicator 172 that is delayed. Here, the change event 222a corresponds to a change being made to the website without a change event indicator 172. Further, the true positive change event 222b may correspond to change event indicator 172 that is sent when the corresponding web page 152 is changed. The false positive change event 222c may correspond to change event indicator 172 that is sent when the corresponding web page 152 is unchanged. The delayed change event 222d corresponds to a change in the web page 152 that occurs a non-trivial amount of time before the server 170 transmits a change event indicator 172. As described above, the web crawler 160 may use change event indicators 172, in part, to determine crawl values 153 for web pages 152.

Further, a machine learning model 161 may be trained to calculate crawl values based on the various change events 222. For example, the machine learning model 161 receives a batch of labeled training data including a number of web pages 152 with the corresponding change events 222 and the change event indicators 172. The machine learning model 161 may be trained to predict the frequency in which web pages 152 are updated (i.e., how often a change event 222 occurs). Further, the machine learning model 161 may also be trained to predict the frequency and type of change event 222. For example, the machine learning model 161 predicts the frequency of changes events 222a—d and adjusts the calculation of the crawl values 153 accordingly.

The web crawler 160, as described herein, provides a marked improvement over traditional web crawling solutions. For example, traditional web crawling systems that employ discrete crawling events without change indicating signals (i.e., change event indicators 172) have a significantly lower accuracy than the web crawler 160 that receives change event indicators 172. Further, by calculating crawl values 153, at least in part, based on available bandwidth 155, the web crawler 160 of the current disclosure also uses system resources more efficiently while maintaining fresher data (i.e., updated web pages 152) in a memory cache. Furthermore, as the bandwidth 155 changes, the web crawler 160 may adjust crawl values 153 accordingly, further resulting in optimized use of system resources. Additionally, As the web crawler 160 implements machine learning techniques to improve crawl value 153 calculations, the web crawler 160 further improves upon previous web crawling systems by efficiently and effectively performing web crawling events to maintain up-to-date data (i.e., web page 152) in the memory cache while reducing consumption of system resources.

Figure 3:
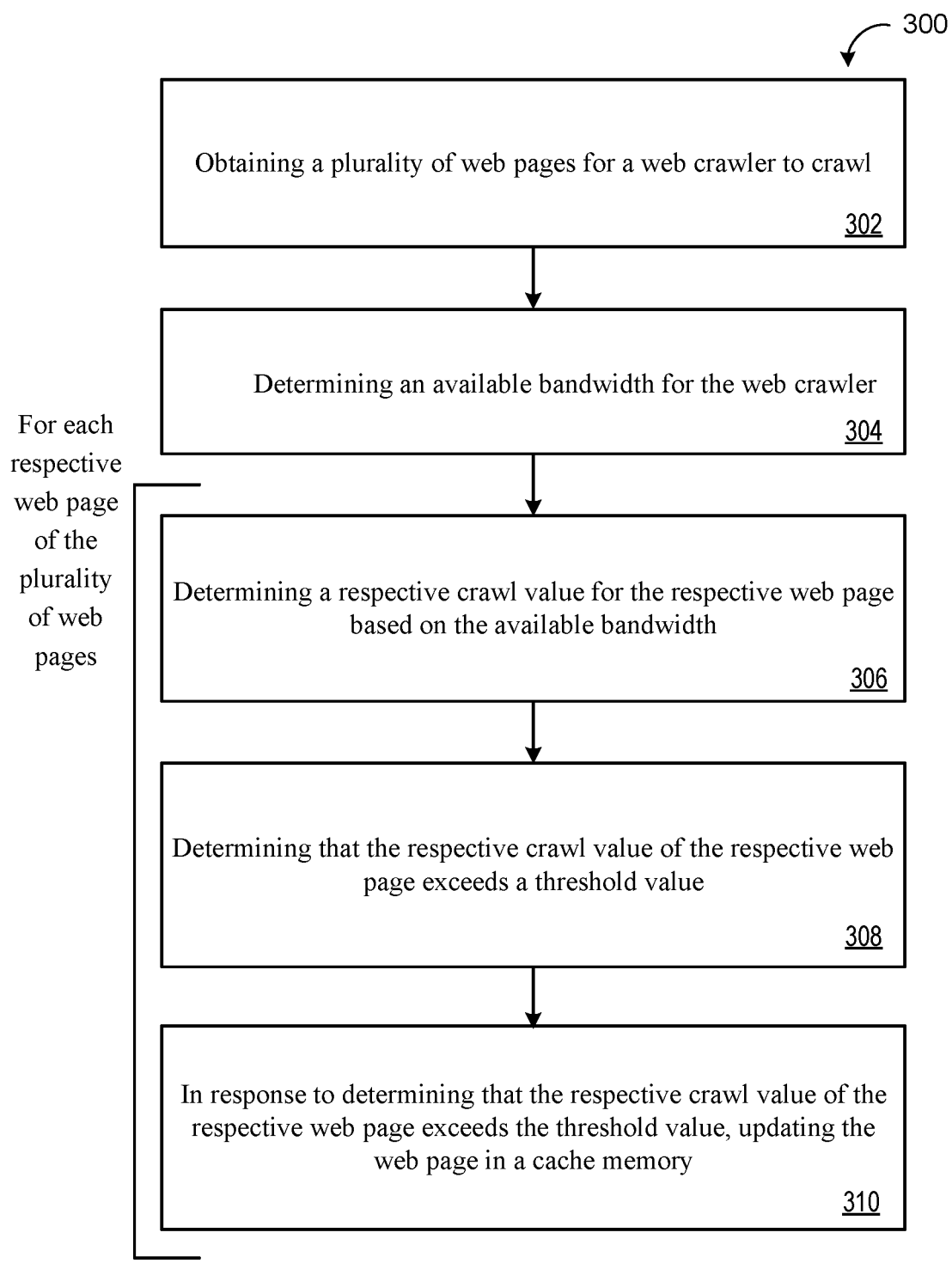
FIG. 3 is a flowchart of an example arrangement of operations for a method of a crawl algorithm.

FIG. 3 is a flowchart of an exemplary arrangement of operations for a method 300 for a crawling algorithm. The method 300 may be performed, for example, by various elements of the system 100 of FIG. 1 or computing device 400 of FIG. 4. For instance, the method 300 may execute on the data processing hardware 144 of the remote system 140, the data processing hardware 16 of the client device 10, the data processing hardware 410 of computing device 400, or some combination thereof. At operation 302, the method 300 includes obtaining a plurality of web pages 152 for a web crawler 160 to crawl. At operation 304, the method 300 includes determining an available bandwidth 155 for the web crawler 160. For each respective web page of the plurality of web pages 152, the method 300 performs operations 306, 308, and 310. At operation 306, the method 300 includes determining a respective crawl value 153 for the respective web includes determining that the respective crawl value 153 of the respective web page 152 satisfies a threshold value 162. At operation 310, the method 300 includes, in response to determining that the respective crawl value 153 of the respective web page 152 satisfies the threshold value 162, updating the web page 152 in a cache memory 150.

Figure 4:
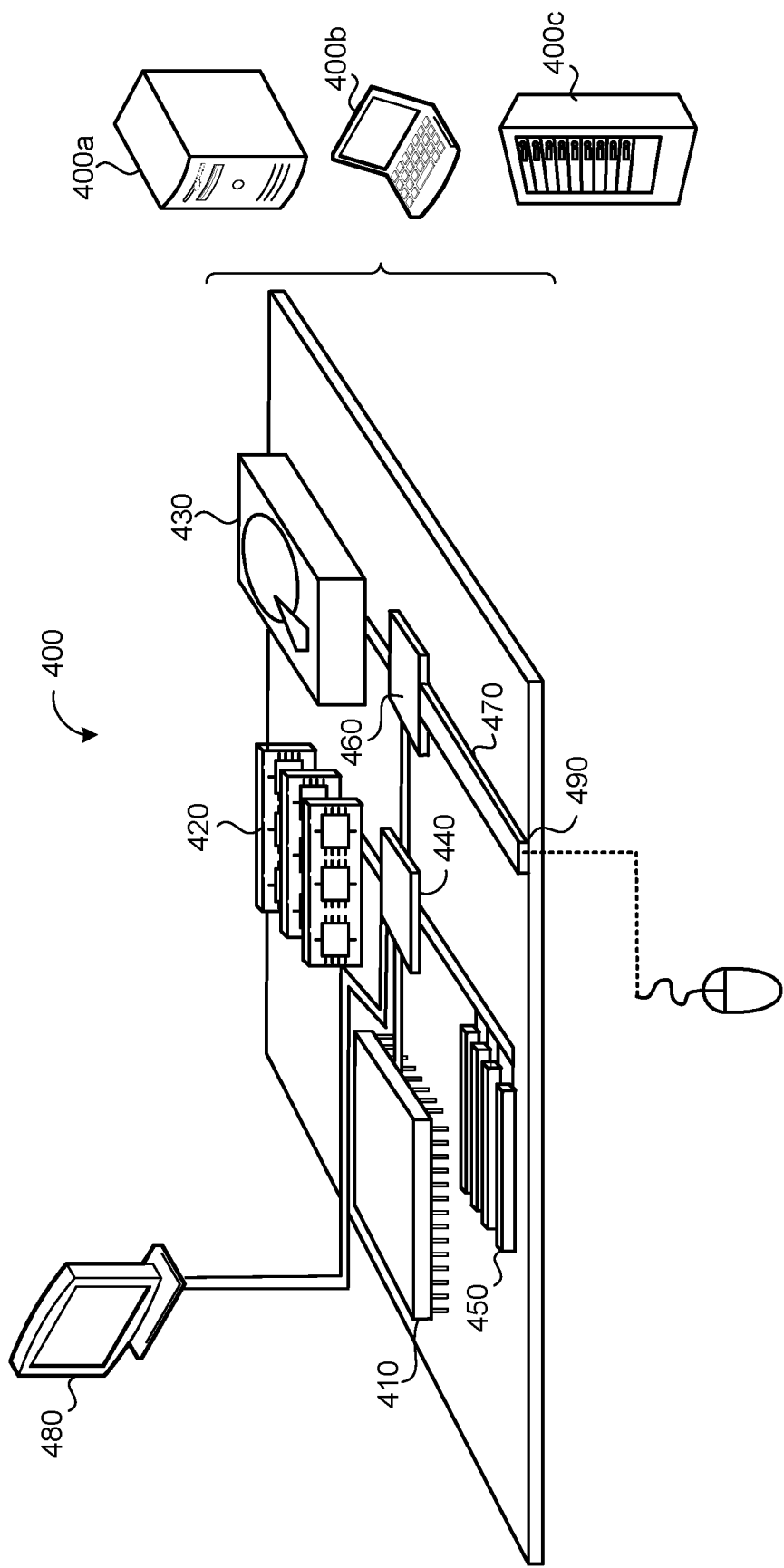
FIG. 4 is a schematic view of an example computing device that may be used to implement the systems and methods described herein.

FIG. 4 is a schematic view of an example computing device 400 that may be used to implement the systems and methods described in this document. The computing device 400 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 400 includes a processor 410, memory 420, a storage device 430, a high-speed interface/controller 440 connecting to the memory 420 and high-speed expansion ports 450, and a low speed interface/controller 460 connecting to a low speed bus 470 and a storage device 430. Each of the components 410, 420, 430, 440, 450, and 460, are interconnected using various busses, and may be mounted on a common motherboard or in other manners as appropriate. The processor 410 can process instructions for execution within the computing device 400, including instructions stored in the memory 420 or on the storage device 430 to display graphical information for a graphical user interface (GUI) on an external input/output device, such as display 480 coupled to high speed interface 440. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 420 stores information non-transitorily within the computing device 400. The memory 420 may be a computer-readable medium, a volatile memory unit(s), or non-volatile memory unit(s). The non-transitory memory 420 may be physical devices used to store programs (e.g., sequences of instructions) or data (e.g., program state information) on a temporary or permanent basis for use by the computing device 400. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 430 is capable of providing mass storage for the computing device 400. In some implementations, the storage device 430 is a computer-readable medium. In various different implementations, the storage device 430 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 420, the storage device 430, or memory on processor 410.

The high speed controller 440 manages bandwidth-intensive operations for the computing device 400, while the low speed controller 460 manages lower bandwidth-intensive operations. Such allocation of duties is exemplary only. In some implementations, the high-speed controller 440 is coupled to the memory 420, the display 480 (e.g., through a graphics processor or accelerator), and to the high-speed expansion ports 450, which may accept various expansion cards (not shown). In some implementations, the low-speed controller 460 is coupled to the storage device 430 and a low-speed expansion port 490. The low-speed expansion port 490, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 400a or multiple times in a group of such servers 400a, as a laptop computer 400b, or as part of a rack server system 400c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware causes the data processing hardware to perform operations comprising:
   obtaining a plurality of web pages for a web crawler to crawl;
   dividing the plurality of web pages into a plurality of shards;
   determining an available bandwidth for the web crawler; and
   for each respective shard of the plurality of shards:
      determining a respective shard crawl value for the respective shard based on the available bandwidth;
      determining that the respective shard crawl value of the respective shard satisfies a threshold shard value; and
      in response to determining that the respective shard crawl value of the respective shard satisfies the threshold shard value, updating each web page of the respective shard in a cache memory.

2. The method of claim 1, wherein the respective shard crawl value is based on a change indicating signal received from one of the web pages.

3. The method of claim 2, wherein the change indicating signal comprises a true positive signal or a false positive signal.

4. The method of claim 2, wherein the change indicating signal comprises a delayed signal.

5. The method of claim 1, wherein the available bandwidth satisfies a bandwidth threshold.

6. The method of claim 1, wherein determining the respective shard crawl value comprises using a machine learning engine to determine the respective shard crawl value.

7. The method of claim 1, wherein each respective shard is assigned a respective shard bandwidth comprising a portion of the available bandwidth.

8. The method of claim 1, wherein the operations further comprise, for each respective web page of the plurality of web pages:
- estimating an update time for the respective shard crawl value of the respective web page; and
- updating the respective shard crawl value of the respective web page at the estimated update time.

9. The method of claim 1, wherein the operations further comprise, for each respective web page of the plurality of web pages, updating the respective shard crawl value for the respective web page at every time step of a discrete time interval.

10. A system comprising:
- data processing hardware; and
- memory hardware in communication with the data processing hardware, the memory hardware storing instructions that when executed on the data processing hardware cause the data processing hardware to perform operations comprising:
  - obtaining a plurality of web pages for a web crawler to crawl;
  - dividing the plurality of web pages into a plurality of shards;
  - determining an available bandwidth for the web crawler; and
  - for each respective shard of the plurality of shards:
    - determining a respective shard crawl value for the respective shard based on the available bandwidth;
    - determining that the respective shard crawl value of the respective shard satisfies a threshold shard value; and
    - in response to determining that the respective shard crawl value of the respective shard satisfies the threshold shard value, updating each web page of the respective shard in a cache memory.

11. The system of claim 10, wherein the respective shard crawl value is based on a change indicating signal received from one of the web pages.

12. The system of claim 11, wherein the change indicating signal comprises a true positive signal or a false positive signal.

13. The system of claim 11, wherein the change indicating signal comprises a delayed signal.

14. The system of claim 10, wherein the available bandwidth satisfies a bandwidth threshold.

15. The system of claim 10, wherein determining the respective shard crawl value comprises using a machine learning engine to determine the respective shard crawl value.

16. The system of claim 10, wherein each respective shard is assigned a respective shard bandwidth comprising a portion of the available bandwidth.

17. The system of claim 10, wherein the operations further comprise, for each respective web page of the plurality of web pages:
- estimating an update time for the respective shard crawl value of the respective web page; and updating the respective shard crawl value of the respective web page at the estimated update time.

18. The system of claim 10, wherein the operations further comprise, for each respective web page of the plurality of web pages, updating the respective shard crawl value for the respective web page at every time step of a discrete time interval.

* * * * *